United States Patent
Hirai et al.

(10) Patent No.: US 10,641,407 B2
(45) Date of Patent: May 5, 2020

(54) FLOW RATE CONTROL DEVICE

(71) Applicant: FUJIKIN INCORPORATED, Osaka (JP)

(72) Inventors: Toru Hirai, Osaka (JP); Kazuyuki Morisaki, Osaka (JP); Kaoru Hirata, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/080,633

(22) PCT Filed: Feb. 23, 2017

(86) PCT No.: PCT/JP2017/006819
§ 371 (c)(1),
(2) Date: Aug. 28, 2018

(87) PCT Pub. No.: WO2017/150331
PCT Pub. Date: Sep. 8, 2017

(65) Prior Publication Data
US 2019/0085988 A1    Mar. 21, 2019

(30) Foreign Application Priority Data
Feb. 29, 2016    (JP) .................................. 2016-038478

(51) Int. Cl.
*F16K 27/02*    (2006.01)
*G05D 7/06*    (2006.01)
(Continued)

(52) U.S. Cl.
CPC ............ *F16K 27/0236* (2013.01); *F16K 7/14* (2013.01); *F16K 7/16* (2013.01); *G05D 7/0635* (2013.01); *Y10T 137/7761* (2015.04)

(58) Field of Classification Search
CPC ... G05D 7/0635; Y10T 137/7761; F16K 7/14; F16K 7/16; F16K 27/0236
(Continued)

(56) References Cited

U.S. PATENT DOCUMENTS 2,687,748 A * 8/1954 Whalen ..................... G01F 1/42
138/44
3,960,239 A * 6/1976 Frochaux ................ B05B 1/005
181/258
(Continued)

FOREIGN PATENT DOCUMENTS

JP    H08-135881 A    5/1996
JP    2003-120832 A   4/2003
(Continued)

OTHER PUBLICATIONS

International Search Report issued in PCT/JP2017/006819; dated May 23, 2017.

*Primary Examiner* — William M McCalister
(74) *Attorney, Agent, or Firm* — Studebaker & Brackett PC

(57) ABSTRACT

The flow controller according to the present invention includes: a control valve; a first flow passage provided on the downstream side of the control valve; a second flow passage; and an expansion chamber provided between the first flow passage and the second flow passage. The second flow passage is provided in a position that is not on the extension of the first flow passage.

20 Claims, 9 Drawing Sheets

(51) Int. Cl.
*F16K 7/14* (2006.01)
*F16K 7/16* (2006.01)

(58) Field of Classification Search
USPC .................................. 137/487.5; 138/37–46
See application file for complete search history.

(56) References Cited

U.S. PATENT DOCUMENTS

| | | | | |
|---|---|---|---|---|
| 4,478,251 A * | 10/1984 | Sanchez | | F16K 3/0227 138/44 |
| 4,794,947 A * | 1/1989 | Kuramochi | | G01F 1/68 137/486 |
| 4,858,643 A * | 8/1989 | Vavra | | F15D 1/0005 137/486 |
| 5,485,984 A * | 1/1996 | Itoi | | F16K 7/16 251/331 |
| 5,582,208 A * | 12/1996 | Suzuki | | F16K 1/34 137/625.29 |
| 5,687,763 A * | 11/1997 | Steinke | | F16K 47/08 137/625.33 |
| 5,816,285 A * | 10/1998 | Ohmi | | G05D 7/0635 137/487.5 |
| 5,909,747 A * | 6/1999 | Schieber | | F16K 7/17 137/492 |
| 5,964,446 A * | 10/1999 | Walton | | G05D 16/0633 137/556 |
| 6,145,544 A * | 11/2000 | Dutertre | | F15D 1/025 138/39 |
| 6,152,168 A * | 11/2000 | Ohmi | | G05D 7/0647 137/486 |
| 6,289,923 B1 * | 9/2001 | Ohmi | | G05D 7/0635 137/486 |
| 6,382,033 B1 * | 5/2002 | van Bekkum | | G01F 1/662 73/861.28 |
| 6,539,968 B1 * | 4/2003 | White | | G05D 7/0635 137/10 |
| 7,131,456 B2 * | 11/2006 | Kang | | G05D 7/0647 137/487.5 |
| 7,334,602 B2 * | 2/2008 | Ahn | | G05D 7/0635 137/486 |
| 7,730,997 B2 * | 6/2010 | Asada | | F02M 35/1216 123/184.53 |
| 7,845,688 B2 * | 12/2010 | Gallagher | | F16L 9/147 138/44 |
| 8,245,727 B2 * | 8/2012 | Mooney | | F16K 7/14 137/625.33 |
| 8,573,247 B2 * | 11/2013 | Ushigusa | | G01F 1/36 137/486 |
| 9,371,930 B2 * | 6/2016 | Hayashi | | F16K 47/00 |
| 9,506,432 B2 * | 11/2016 | Inoue | | F02M 35/1211 |
| 9,507,352 B2 * | 11/2016 | Dohi | | F16K 7/16 |
| 10,330,212 B2 * | 6/2019 | Chase | | F16K 31/007 |
| 10,364,897 B2 * | 7/2019 | Vu | | F16K 1/44 |
| 10,372,145 B2 * | 8/2019 | Hirose | | F16K 7/14 |
| 10,386,863 B2 * | 8/2019 | Hirata | | F16K 31/004 |
| 2003/0061888 A1 * | 4/2003 | Gould | | G01F 1/36 73/861.52 |
| 2006/0076060 A1 * | 4/2006 | Ohmi | | G05D 7/0635 137/334 |
| 2006/0096650 A1 * | 5/2006 | Sawchuk | | F15D 1/001 138/39 |
| 2009/0171507 A1 * | 7/2009 | Ohmi | | F16K 27/003 700/282 |
| 2012/0318383 A1 * | 12/2012 | Yasuda | | G05D 7/0635 137/455 |
| 2014/0299210 A1 * | 10/2014 | Atherton | | G01F 1/74 137/624.27 |
| 2015/0114499 A1 | 4/2015 | Dohi et al. | | |
| 2016/0349763 A1 | 12/2016 | Hirose et al. | | |
| 2017/0336810 A1 * | 11/2017 | Altonji | | G01F 1/48 |
| 2019/0085988 A1 * | 3/2019 | Hirai | | G05D 7/0635 |

FOREIGN PATENT DOCUMENTS

| | | |
|---|---|---|
| JP | 2005-024080 A | 1/2005 |
| JP | 2010-218571 A | 9/2010 |
| JP | 2011-080822 A | 4/2011 |
| JP | 2013-228950 A | 11/2013 |
| JP | 2015-158755 A | 9/2015 |
| TW | 201535081 A | 9/2015 |
| WO | WO-2013161186 A1 * | 10/2013 |
| WO | WO-2015083343 A1 * | 6/2015 |

* cited by examiner

FLOW RATE CONTROL DEVICE

TECHNICAL FIELD

The present invention relates to a flow controller.

BACKGROUND ART

Conventionally, as shown in FIG. 11, a flow controller (also referred to as "pressure-type flow controller") including a main body block 3 having formed therein a flow passage 2 that connects between a gas inlet 2a and a gas outlet 2b, a restriction part OR interposed in the flow passage 2, a control valve 4 interposed in the flow passage 2 upstream from the restriction part OR, a first pressure detector 5a that detects the pressure in the flow passage 2 between the control valve 4 and the restriction part OR, and a controller 6 that controls the control valve 4 so as to achieve a predetermined flow rate based on a value detected by the first pressure detector 5a is known (Patent Document 1, etc.).

This control utilizes the principle that when a so-called critical expansion condition of ($P_1/P_2$) about 2 is maintained between an upstream pressure ($P_1$) of the restriction part OR and a downstream pressure ($P_2$) of the restriction part OR, a flow rate (Q) of the gas G flowing through the restriction part OR, such as an orifice, establishes the relation $Q=KP_1$ (K is a constant).

Based on this principle, the control valve 4 is precisely feedback-controlled so that the upstream pressure ($P_1$) detected by the first pressure detector 5a becomes a predetermined pressure. As a result, the flow rate (Q) passing through the restriction part OR can be precisely controlled to the predetermined flow rate. A piezoelectrically actuated control valve, a solenoid valve, or the like, which is capable of precise control, is used as the control valve 4.

Under a non-critical expansion condition, the following relation holds true: flow rate $Qc=K_2 P_2^m (P_1-P_2)^n$ ($K_2$ is a proportionality coefficient depending on the kind of fluid and the fluid temperature, and exponents m and n are values derived from the actual flow). The downstream pressure ($P_2$) is detected by a second pressure detector (not shown) separately provided on the downstream side of the restriction part OR. Under a non-critical expansion condition, using the above relational expression that holds true under a non-critical expansion condition, the flow rate can be determined by computation from the output of the first pressure detector 5a on the restriction part OR upstream side and the output of the second pressure detector on the restriction part OR downstream side, and the flow controller controls the degree of opening/closing of the control valve so that the determined flow rate becomes the same as the set flow rate (Patent Document 2, etc.).

However, due to influences of a pressure regulating valve (not shown) and the like disposed upstream from the flow controller of this type, the pressure of the gas G flowing through the flow passage 2 may periodically oscillate, resulting in the hunting (pulsation) of the pressure detected by the first pressure detector 5a. The hunting of the detected pressure makes the flow control unstable.

Conventionally, in order to suppress such hunting, software-wise measures and mechanical measures are known. As software-wise measures, for example, the coefficient used in computation by the controller of a flow controller is changed and optimally controlled to suppress hunting (e.g., Patent Document 3, etc.). However, with such software-wise measures, it is not easy to derive the optimum value of the coefficient to be changed.

As mechanical measures, for example, a technique in which a distribution plate having a flow straightening effect, such as a metal mesh plate or an orifice plate, is interposed in a flow passage to distribute a gas flow, or a technique in which a chamber that expands the cross-sectional area of a flow passage is formed in the middle of a flow passage, thereby absorbing pressure fluctuation, are known (e.g., Patent Documents 4 to 6, etc.).

CITATION LIST

Patent Literature

Patent Document 1: Japanese Laid-Open Patent Publication No. 2003-120832
Patent Document 2: Japanese Laid-Open Patent Publication No. 2010-218571
Patent Document 3: Japanese Laid-Open Patent Publication No. 2015-158755
Patent Document 4: Japanese Laid-Open Patent Publication No. 2005-24080
Patent Document 5: Japanese Laid-Open Patent Publication No. 2011-80822
Patent Document 6: Japanese Laid-Open Patent Publication No. H8-135881

SUMMARY OF INVENTION

Technical Problem

Techniques in which the chamber is formed in the middle of a flow passage have been conventionally known. However, in all such structures, the chamber is provided in the middle of an existing pipe, assuming that fluid pressure fluctuation that occurs during piping is thereby suppressed. In addition, because the chamber is provided in the middle of a pipe, usually, the inlet and outlet of the chamber are located on the same axis. Therefore, when a fluid having pressure fluctuation enters the chamber, in the case of a low-flow fluid, the fluid that has entered the chamber is diffused in the entire chamber, and thus pressure fluctuation can be suppressed. However, in the case where a high-flow fluid enters the chamber, the fluid reaches the chamber outlet before being diffused in the chamber. Accordingly, the pressure fluctuation of the fluid cannot be completely suppressed. Although the chamber size could be increased in order to make it possible to suppress pressure fluctuation even in the case of a high-flow fluid, because of the trend of downsizing of semiconductor manufacturing devices in recent years, it is difficult to ensure a large volume in a flow controller. In addition, although the chamber could be provided on the upstream side of a flow controller to suppress pressure fluctuation involved in a fluid from upstream, because a control valve and the like in the flow controller is also one of the factors causing pressure fluctuation to the fluid, it is insufficient to merely dispose the chamber outside the flow controller.

In addition, it is possible to attach a distribution plate in order to suppress pressure oscillation between the control valve 4 and the restriction part OR. However, the distribution plate, such as a metal mesh, interposed in the flow passage 2 in FIG. 11, increases pressure drop. That is, the mesh or the like forming the distribution plate reduces the cross-sectional area of the flow passage, which causes resistance to the fluid, leading to a problem in that pressure drop occurs.

In addition, in the case where the distribution plate, such as a metal mesh, is replaced upon maintenance, pipes connected to the gas outlet 2b and other parts (not shown), the restriction part OR formed of an orifice plate or the like, and the like have to be detached and disassembled, which takes time and effort. In addition, at the time of assembly, when the distribution plate in the form of a thin plate is inserted into a flow passage, the distribution plate may be tilted in the flow passage, for example, making insertion difficult.

Thus, a main object of the present invention is to provide a flow controller that allows for high flows and is also capable of suppressing hunting in a flow passage while meeting the demand for smaller devices. Another object of the present invention is to provide a flow controller capable of improving maintainability and assemblability.

Solution to Problem

In order to achieve the above objects, a first aspect of the flow controller according to the present invention includes: a control valve; a first flow passage provided on the downstream side of the control valve; a second flow passage; and an expansion chamber provided between the first flow passage and the second flow passage. The second flow passage is provided in a position that is not on the extension of the first flow passage.

A second aspect of the flow controller according to the present invention includes a control valve; a first flow passage provided on the downstream side of the control valve; a second flow passage; an expansion chamber provided between the first flow passage and the second flow passage; and a distribution plate disposed in the expansion chamber.

A third aspect of the flow controller according to the present invention is configured such that in the first aspect or the second aspect, the second flow passage is provided with a restriction part.

A fourth aspect of the flow controller according to the present invention is configured such that in the third aspect, a first pressure detector is provided between the control valve and the restriction part.

A fifth aspect of the flow controller according to the present invention is configured such that in the fourth aspect, the first pressure detector is provided on the second flow passage and upstream from the restriction part.

A sixth aspect of the flow controller according to the present invention is configured such that in the fifth aspect, the flow controller further includes a second pressure detector for detecting the pressure in the second flow passage on the downstream side of the restriction part.

A seventh aspect of the flow controller according to the present invention is configured such that in the first aspect or the second aspect, the flow controller further includes a main body block having formed therein the first flow passage and the second flow passage, and the expansion chamber is formed of a main body recess formed in the main body block and a lid body attached to the main body block so as to close the main body recess formed in the main body block.

An eighth aspect of the flow controller according to the present invention is configured such that in the seventh aspect, the lid body has formed therein a lid body recess for increasing the volume of the expansion chamber.

A ninth aspect of the flow controller according to the present invention is configured such that in the eighth aspect, the main body block and the lid body are joined together through a metal sealing gasket.

A tenth aspect of the flow controller according to the present invention is configured such that in the ninth aspect, a spotfacing part for receiving the lid body is formed around the main body recess.

An eleventh aspect of the flow controller according to the present invention is configured such that in the tenth aspect, in the lid body, a spotfacing hole for a bolt for fixing the lid body to the main body block is formed around the lid body recess.

A twelfth aspect of the flow controller according to the present invention is configured such that in the first aspect, a distribution plate is disposed in the expansion chamber.

A thirteenth aspect of the flow controller according to the present invention is configured such that in the second aspect or the twelfth aspect, a distribution plate retainer is provided in the expansion chamber. The distribution plate retainer is provided between an upstream-side opening formed by the first flow passage opening into the expansion chamber and a downstream-side opening formed by the second flow passage opening into the expansion chamber and retains the distribution plate at a predetermined distance from the upstream-side opening.

A fourteenth aspect of the flow controller according to the present invention is configured such that in the thirteenth aspect, the distribution plate retainer has a tubular peripheral wall having an aperture and is disposed in such a manner that the aperture faces the downstream-side opening of the expansion chamber.

A fifteenth aspect of the flow controller according to the present invention is configured such that in the thirteenth aspect, the expansion chamber is formed of a main body recess formed in the main body block and a lid body attached to the main body block so as to close the main body recess formed in the main body block, and the distribution plate retainer is fixed to the lid body.

A sixteenth aspect of the flow controller according to the present invention is configured such that in the thirteenth aspect, the distribution plate is fixed by welding to the distribution plate retainer.

A seventeenth aspect of the flow controller according to the present invention is configured such that in the second aspect or the twelfth aspect, the distribution plate may be formed of a metal mesh.

Advantageous Effects of Invention

According to the present invention, an expansion chamber is disposed on the downstream side of a control valve that causes pressure oscillation in the flow controller. As a result, pressure oscillation that has occurred on the upstream side of the flow controller and in the control valve can be collectively reduced.

In addition, a fluid that has flowed into the expansion chamber through the first flow passage flows out from the expansion chamber through the second flow passage configured as above. As a result, the fluid that has flowed into the expansion chamber does not flow out in the same direction as the inflow direction. Accordingly, even a high-flow fluid flows out from the expansion chamber after being diffused in the expansion chamber, whereby the pressure fluctuation suppressing effect of the expansion chamber can be ensured.

In addition, a lid body recess for increasing the volume of the expansion chamber is formed in a lid body. As a result, while enhancing the rigidity of the lid body and ensuring the sealing performance for closing the main body recess, the volume of the expansion chamber can be increased.

Further, the lid body having formed therein the lid body recess is received in a spotfacing part formed around the main body recess. As a result, the volume of the expansion chamber can be increased while enhancing the rigidity of the lid body and ensuring the sealing performance, and also the dimension of the lid body protruding from the main body block can be suppressed, whereby a dimensional increase of the flow controller can be suppressed.

Further, a distribution plate is disposed in the expansion chamber. As a result, while expanding the area of the distribution plate and preventing an increase in pressure drop, pressure oscillation can be reduced.

In addition, the expansion chamber is formed of the main body recess formed in the main body block and the lid body that closes the main body recess, and also the distribution plate is retained in a predetermined position by the distribution plate retainer received in the expansion chamber. As a result of this configuration, the distribution plate can be removed from the main body block by removing the lid body from the main body block. Accordingly, without removing the pipe parts, restriction part and the like connected to the gas outlet, it is easy to perform maintenance, such as replacing the distribution plate, declogging, etc. In addition, also when a thin distribution plate is to be incorporated, the distribution plate can be inserted into the main body recess while being placed on the distribution plate retainer, making assembly easy.

DESCRIPTION OF EMBODIMENTS

Figure 1:
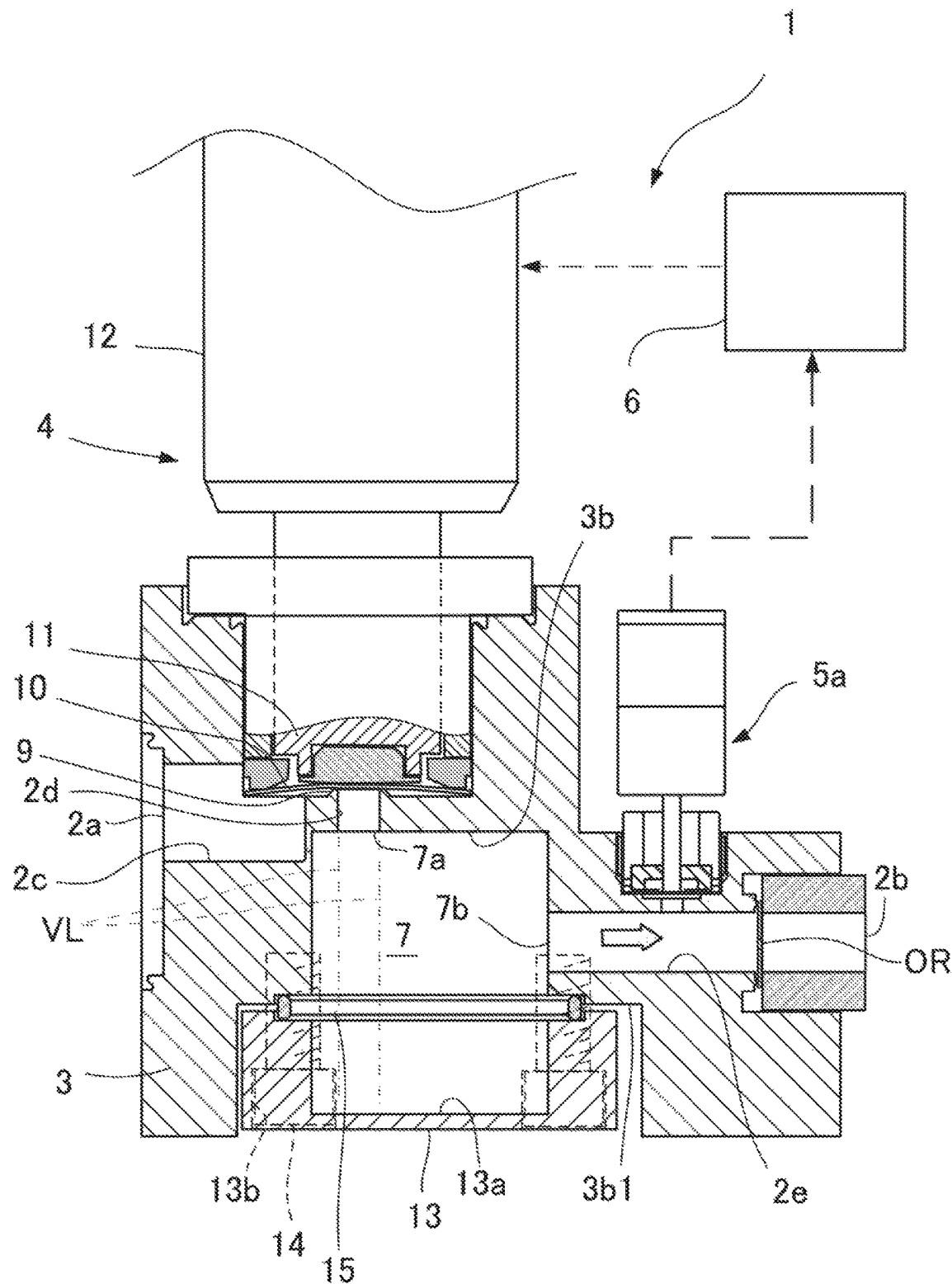
FIG. 1 A longitudinal-sectional front view of an essential part, showing a first embodiment of the flow controller according to the present invention.

Hereinafter, embodiments of the present invention will be described with reference to FIG. 1 to FIG. 10. Through all the figures and embodiments including the prior art, same or similar components will be indicated with the same reference numeral.

First, a first embodiment of the flow controller according to the present invention will be described with reference to FIG. 1.

The flow controller 1 of the first embodiment includes: a main body block 3 including a gas inlet 2a, a gas outlet 2b, an inlet-side flow passage 2c communicating with the gas inlet 2a, a first flow passage 2d connected to the inlet-side flow passage 2c, and a second flow passage 2e communicating with the gas outlet 2b; a control valve 4 fixed to the main body block 3 and interposed between and connected to the inlet-side flow passage 2c and the first flow passage 2d; a restriction part OR interposed in the second flow passage 2e downstream from the control valve 4; a first pressure detector 5a that detects the pressure between the control valve 4 and the restriction part OR; a controller 6 that controls the control valve 4 to achieve a predetermined flow based on the value detected by the first pressure detector 5a; and an expansion chamber 7 formed inside the main body block 3 between the first flow passage 2d and the second flow passage 2e to expand the sectional area of the flow passage between the control valve 4 and the first pressure detector 5a.

The expansion chamber 7 includes an upstream-side opening 7a formed by the opening of the first flow passage 2d extending from the control valve 4 and a downstream-side opening 7b formed by the opening of the second flow passage 2e. The second flow passage 2e is provided in a position that is not on the extension of the first flow passage 2d. For the easy understanding of "on the extension of the first flow passage 2d", virtual lines VL showing the virtual extension of the first flow passage 2d are given as dashed-dotted lines. Therefore, the second flow passage 2e and the first flow passage 2d are not on the same axis across the expansion chamber 7. Accordingly, the downstream-side opening 7b is formed in a position that is not opposite to the upstream-side opening 7a across the expansion chamber 7.

Because the expansion chamber 7 is disposed downstream from the control valve 4 that causes pressure oscillation in the flow controller as above, pressure oscillation that has occurred on the upstream side of the pressure-type flow controller 1 and in the control valve 4 can be collectively reduced.

In addition, because of the configuration such that the fluid that has flowed into the expansion chamber 7 through the upstream-side opening 7a flows out from the downstream-side opening 7b provided in a position that is not on the extension of the first flow passage 2d, the fluid that has flowed into the expansion chamber 7 cannot come out straight from the expansion chamber 7. Therefore, even a high-flow fluid flows out from the expansion chamber 7 after being diffused in the expansion chamber 7, whereby the pressure fluctuation suppressing effect of the expansion chamber 7 can be ensured.

The main body block 3 is made of stainless steel or the like. The control valve 4 of the illustrated example includes a metal diaphragm valve element 10 that comes into or out of contact with a valve seat 9 formed in the first flow passage 2d, a valve stem 11 that presses the metal diaphragm valve element 10, and an actuator 12 that actuates the valve stem 11. In the actuator 12, the source of actuation may be a solenoid, a piezoelectric element, oil pressure, pneumatic pressure, or the like. FIG. 1 shows the state where the actuator 12 is in an actuating state, where the valve stem 11 presses the metal diaphragm valve element 10, and the metal diaphragm valve element 10 is in contact with the valve seat 9 to close the first flow passage 2d. When the actuator 12 turns into a non-actuating state, the valve stem 11 is moved upward in the figure by a built-in spring (not shown) or the like, and the metal diaphragm valve element 10 returns to the original form due to the self-elastic force and comes off the valve seat 9 to open the first flow passage 2d.

A lid body recess 13a is formed on the inner side of the lid body 13. The lid body recess 13a further expands the volume of the expansion chamber 7. The lid body 13 is received in a spotfacing part 3b1 formed around a main body recess 3b of the main body block 3.

The lid body 13 has formed therein a spotfacing hole 13b. A bolt 14 is passed through the spotfacing hole 13b, and the bolt 14 is screw-fastened into a female screw hole formed in the main body block 3, whereby the lid body 13 is fixed to the main body block 3. The bolt 14 may be a hexagon socket head cap screw. Between the lid body 13 and the main body block 3, a metal sealing gasket 15 is interposed.

There has been a demand for smaller flow controllers of this type. When the lid body recess 13a is formed in the lid body 13 to serve as a part of the expansion chamber 7 as described above, a dimensional increase of the main body block 3 can be suppressed while ensuring a larger expansion chamber 7. In addition, with respect to the lid body 13, in order to ensure the high sealing performance of the metal sealing gasket 15, it is necessary to ensure a certain thickness to enhance the rigidity, but the desired thickness can be ensured at a portion having no lid body recess 13a. In addition, when the spotfacing hole 13b is formed in the lid body 13, and the head of the bolt 14 is embedded therein, dimensional expansion can be suppressed.

Figure 2:
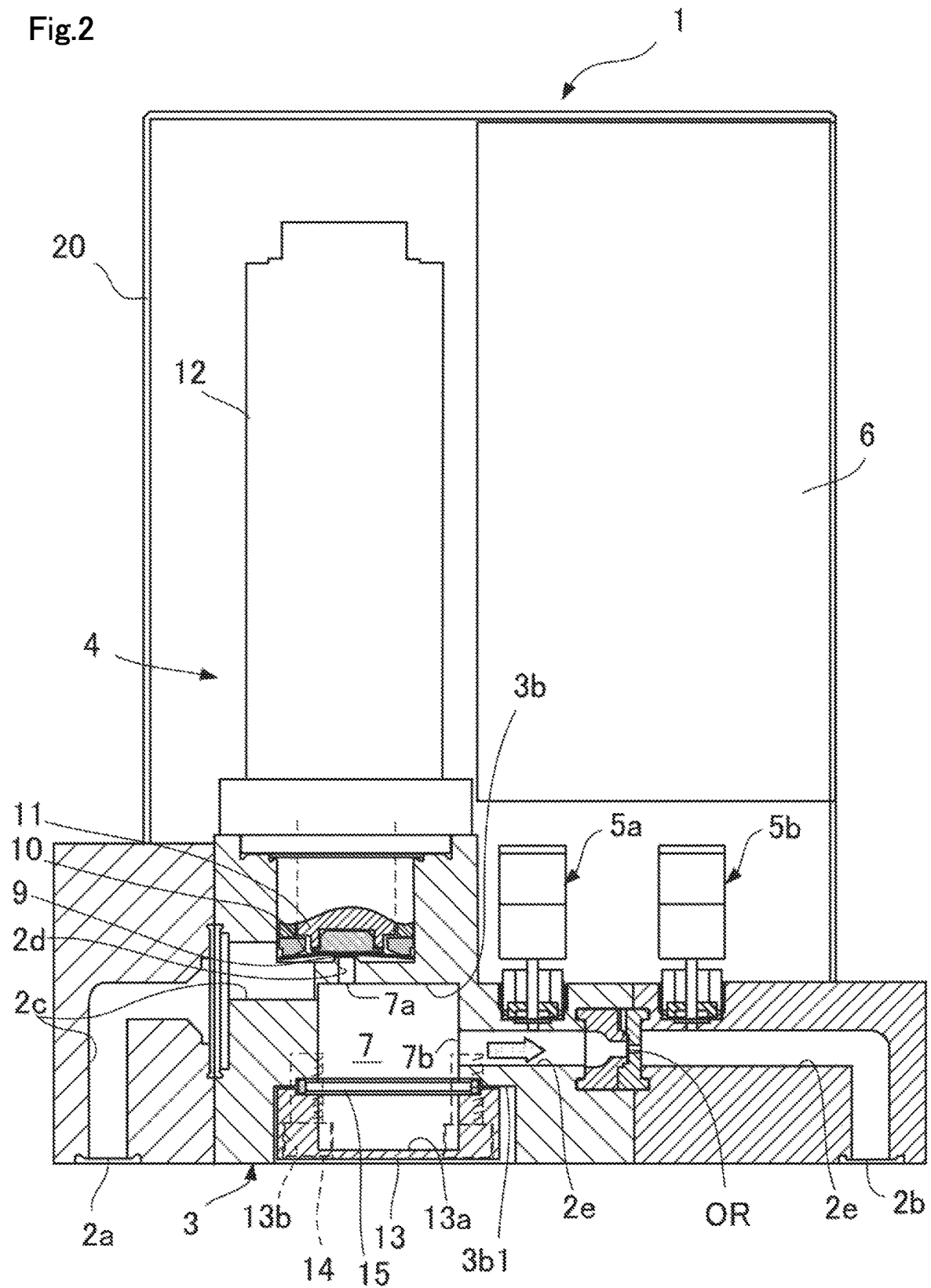
FIG. 2 A longitudinal-sectional front view of an essential part, showing a second embodiment of the flow controller according to the present invention.

FIG. 2 shows a second embodiment of the flow controller according to the present invention. The flow controller 1 of the second embodiment is different from the first embodiment in that it includes a second pressure detector 5b for detecting the pressure in the second flow passage 2e on the downstream side of the restriction part OR. The presence of the second pressure detector 5b makes it possible to control the flow even under a non-critical expansion condition. The main body block 3 shown in FIG. 2 is formed of three block elements connected, and a casing 20 is fixed to the main body block 3.

Figure 3:
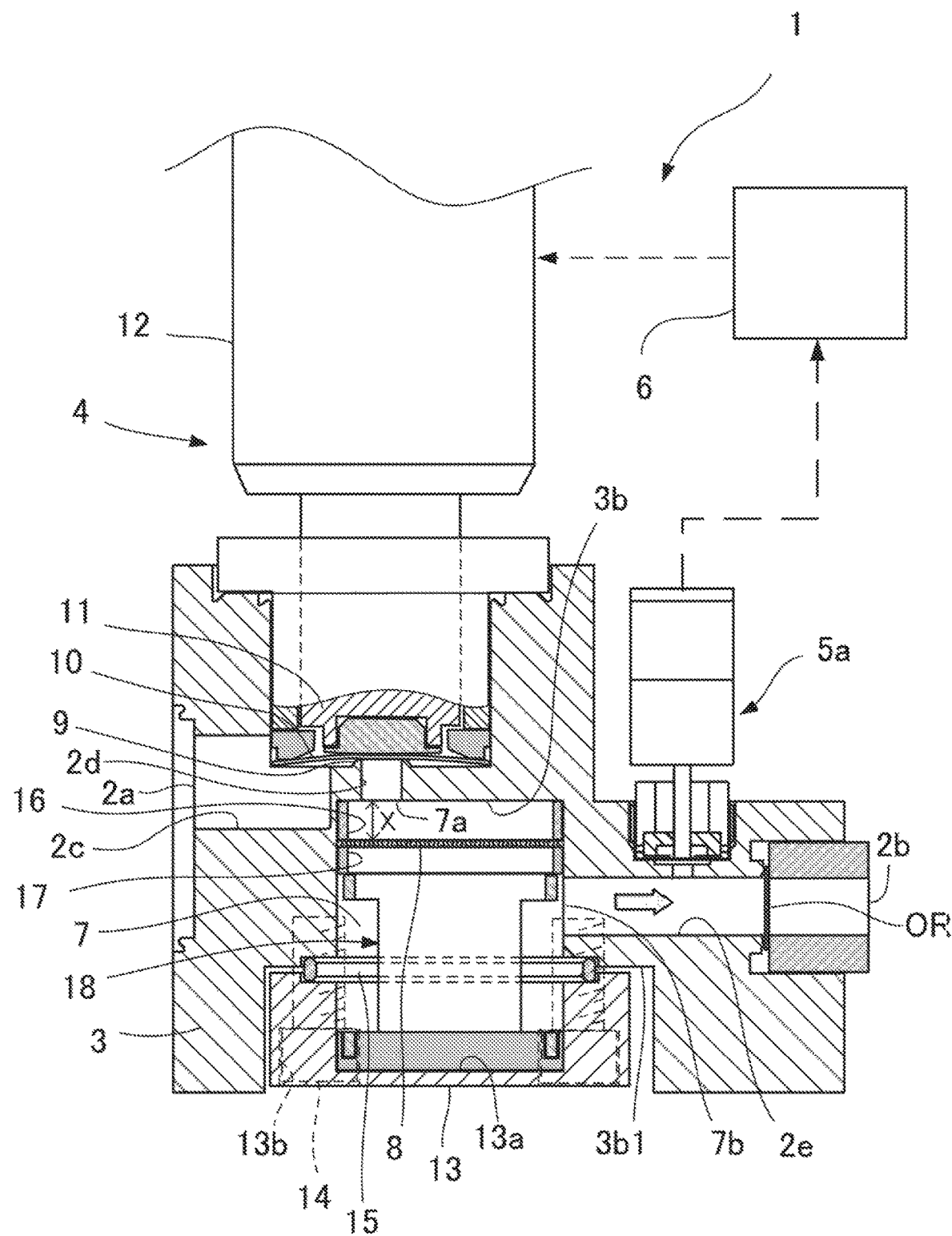
FIG. 3 A longitudinal-sectional front view of an essential part, showing a third embodiment of the flow controller according to the present invention.
Figure 4:
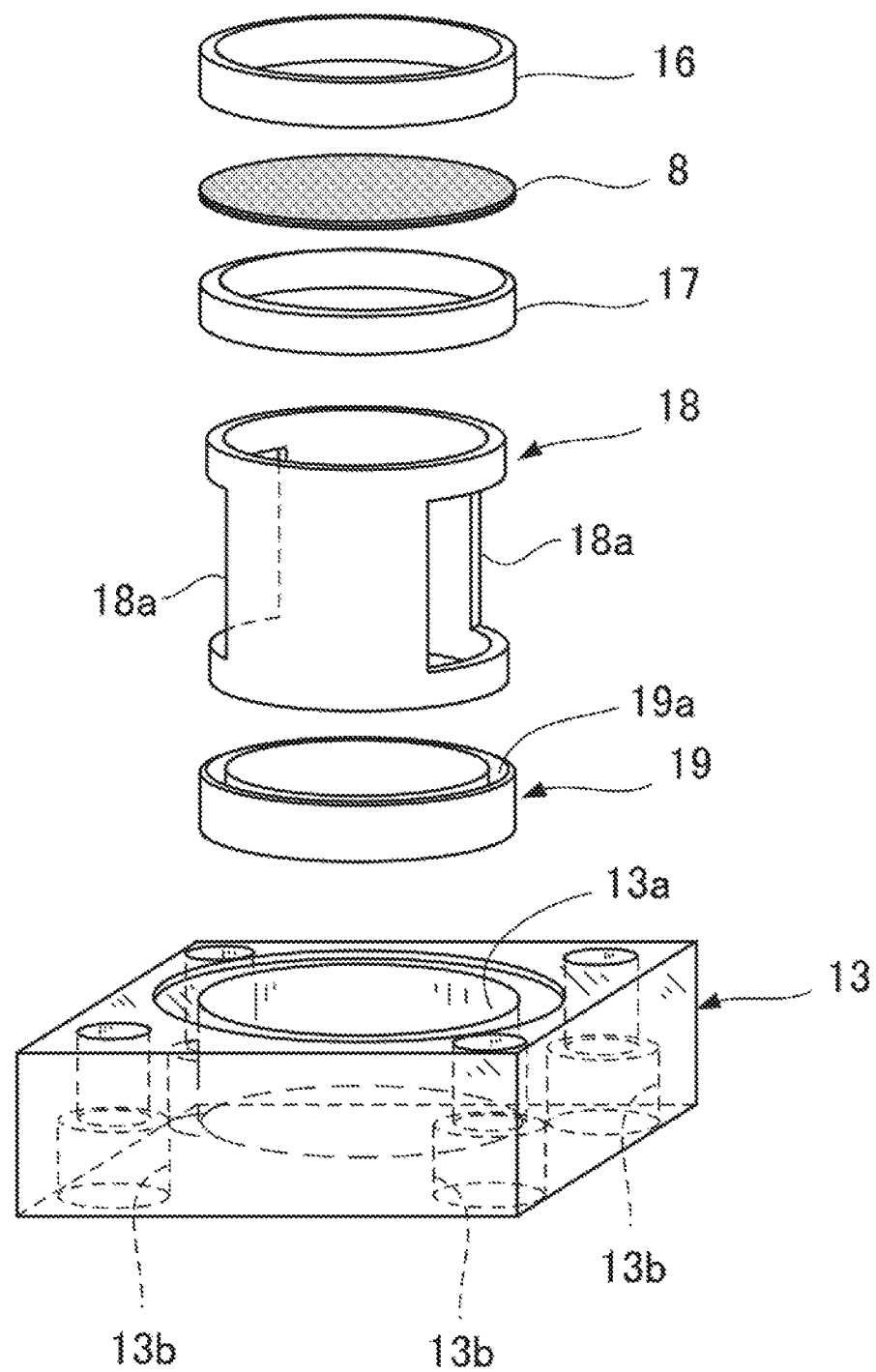
FIG. 4 A perspective view showing some of the internal structural elements of the flow controller of FIG. 3 as disassembled.

Next, a third embodiment of the flow controller according to the present invention will be described with reference to FIG. 3 and FIG. 4.

The flow controller of the third embodiment is different from the first embodiment in that a distribution plate 8, a distribution plate retainer 18 for retaining the distribution plate 8, a spacer ring 16, and a gasket ring 17 are disposed in the expansion chamber 7.

The distribution plate 8 is a plate-shaped member capable of uniformizing the gas flow distribution (drift) and capable of attenuating disturbance the gas flow distribution (drift) through the use of the flow resistance of fine pores, and may be formed of a metal mesh, a porous plate, a honeycomb structure, or the like.

The distribution plate 8 is sandwiched between the spacer ring 16 made of stainless steel and the gasket ring 17 made of resin. The distribution plate 8 sandwiched between the spacer ring 16 and the gasket ring 17 is retained by the distribution plate retainer 18 in a position above the downstream-side opening 7b and below the upstream-side opening 7a with a predetermined space X. Although the gasket ring 17 is made of PCTFE (polychlorotrifluoroethylene), other gasket materials are also applicable. Although the spacer ring 16 is provided in the illustrated example, it is also possible to form a level difference on the bottom of the main body recess 3 to replace the spacer ring 16.

In the distribution plate retainer 18, an aperture 18a (FIG. 4) is formed in a tubular peripheral wall. In order for the expansion chamber 7 and the second flow passage 2e downstream from the expansion chamber 7 to communicate with each other, the distribution plate retainer 18 is disposed in such a manner that the aperture 18a faces the downstream-side opening 7b of the expansion chamber 7. The aperture 18a may have an opening area equal to or greater than the sectional area of the second flow passage 2e downstream side of the expansion chamber 7.

Between the distribution plate retainer 18 and the lid plate 13, an annular gasket 19 is interposed. A lower end portion of the distribution plate retainer 18 is fitted into an annular recess 19a formed in the gasket 19.

In addition, the distribution plate 8 preferably has a thickness of 0.1 to 0.5 mm. This is because when the thickness of the distribution plate 8 is more than 0.5 mm, pressure drop increases, whereby pressure oscillation exceeds the required range.

In the flow controller of the third embodiment, the distribution plate 8 is disposed in the expansion chamber 7. As a result, while preventing an increase in pressure drop, pressure oscillation can be reduced. In addition, the distribution plate 8 is retained in a predetermined position by the distribution plate retainer 18 installed upright on the lid body 13. As a result of this configuration, the distribution plate 8 can be removed from the bottom of the main body block 3. Accordingly, without removing the pipe parts, restriction part OR, and the like connected to the gas outlet 2b, it is easy to perform maintenance, such as replacing the distribution plate 8, declogging, etc. In addition, also when a thin distribution plate 8 is to be incorporated, the distribution plate 8 can be placed on the distribution plate retainer 18 and inserted into the main body recess 3b from below, making assembly easy.

Figure 5:
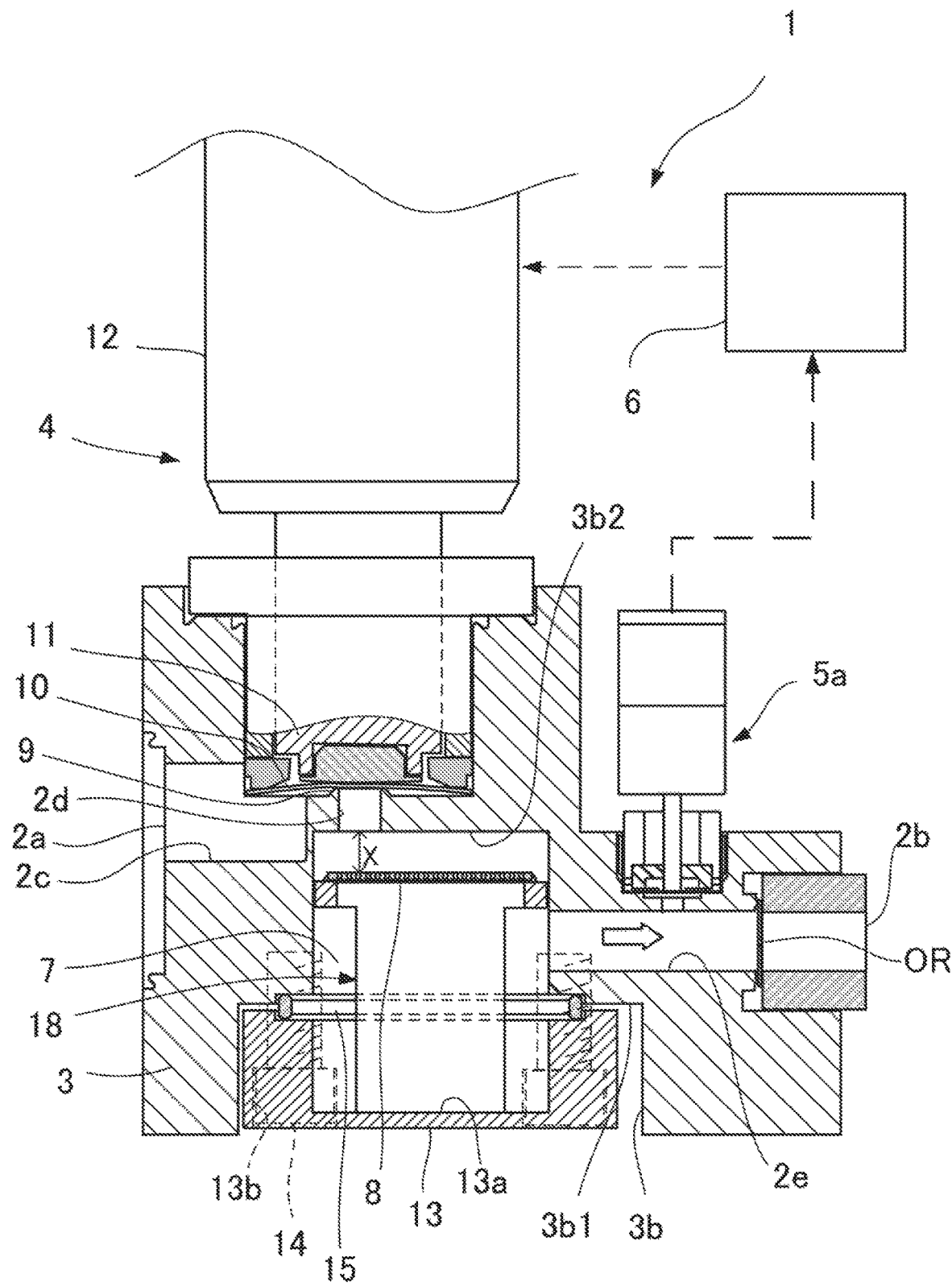
FIG. 5 A longitudinal-sectional front view of an essential part, showing a forth embodiment of the flow controller according to the present invention.
Figure 6:
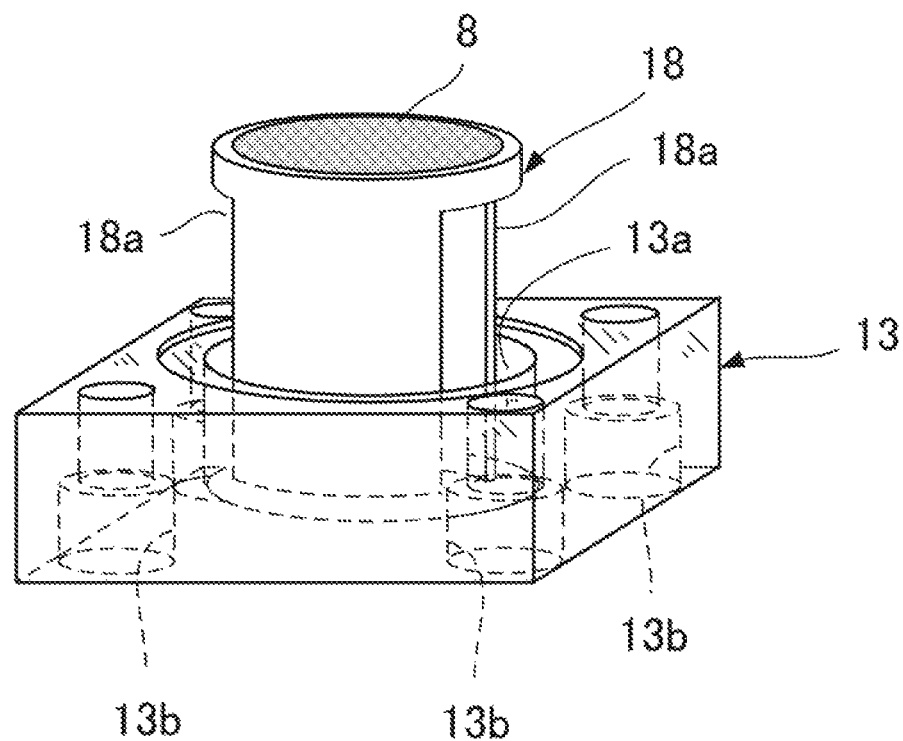
FIG. 6 A perspective view showing some of the internal structural elements of the flow controller of FIG. 5.

Next, a fourth embodiment of the flow controller according to the present invention will be described with reference to FIG. 5 and FIG. 6. In the fourth embodiment, the distribution plate retainer 18 is fixed to the lid body 13 by welding, integral molding, or other means. The distribution plate retainer 18 is shaped such that an aperture 18a is formed by cutout in the cylindrical peripheral surface.

In addition, the distribution plate 8 is fixed by welding to the upper surface of the distribution plate retainer 18. The distribution plate 8 of the illustrated example is a metal mesh of 230 mesh formed by plain-weaving a stainless wire having a wire diameter of 0.04 mm, and its porosity is about 40%. In other respects, the configuration of the fourth embodiment is the same as that of the third embodiment.

In the flow controller of the fourth embodiment, when the distribution plate 8 is replaced, the lid body 13 and the distribution plate retainer 18 are also to be replaced at the same time. However, the workability upon replacement is improved, and the workability upon assembly is also improved. In addition, the parts may all be metal parts, and contamination of the process gas is unlikely to occur.

In the above first to fourth embodiments, examples in which the lid body 13 is provided on the bottom of the main body block 3 have been shown. However, the lid body 13 may also be provided on the side surface of the main body block 3.

EXAMPLES

Hereinafter, the present invention will be described in further detail with reference to examples and comparative examples. However, the present invention is not limited to these examples.

Figure 7:
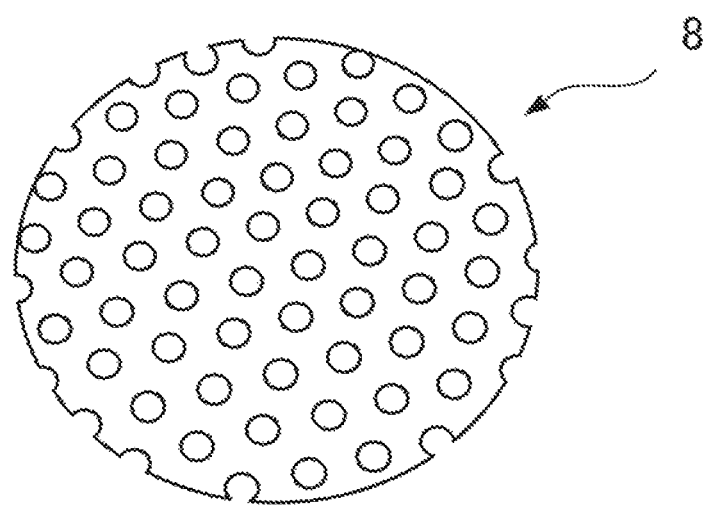
FIG. 7 A plan view showing one embodiment of the distribution plate, which is a structural element of the flow controller according to the present invention.

In Example 1, a flow controller having the configuration of FIG. 1 was used. In Example 2, the flow controller shown in FIG. 3 was used. As the distribution plate of Example 2, a distribution plate made of stainless steel shaped as shown in FIG. 7 having a pore size of 1 mm, 37 holes, a pitch of 2 mm, a thickness of 0.5 mm, and an aperture ratio of 22.7% was used. In Examples 1 and 2, the internal volume of the flow passage from the valve seat 9 of the control valve 4 to the restriction part OR was about 5 cc.

Figure 11:
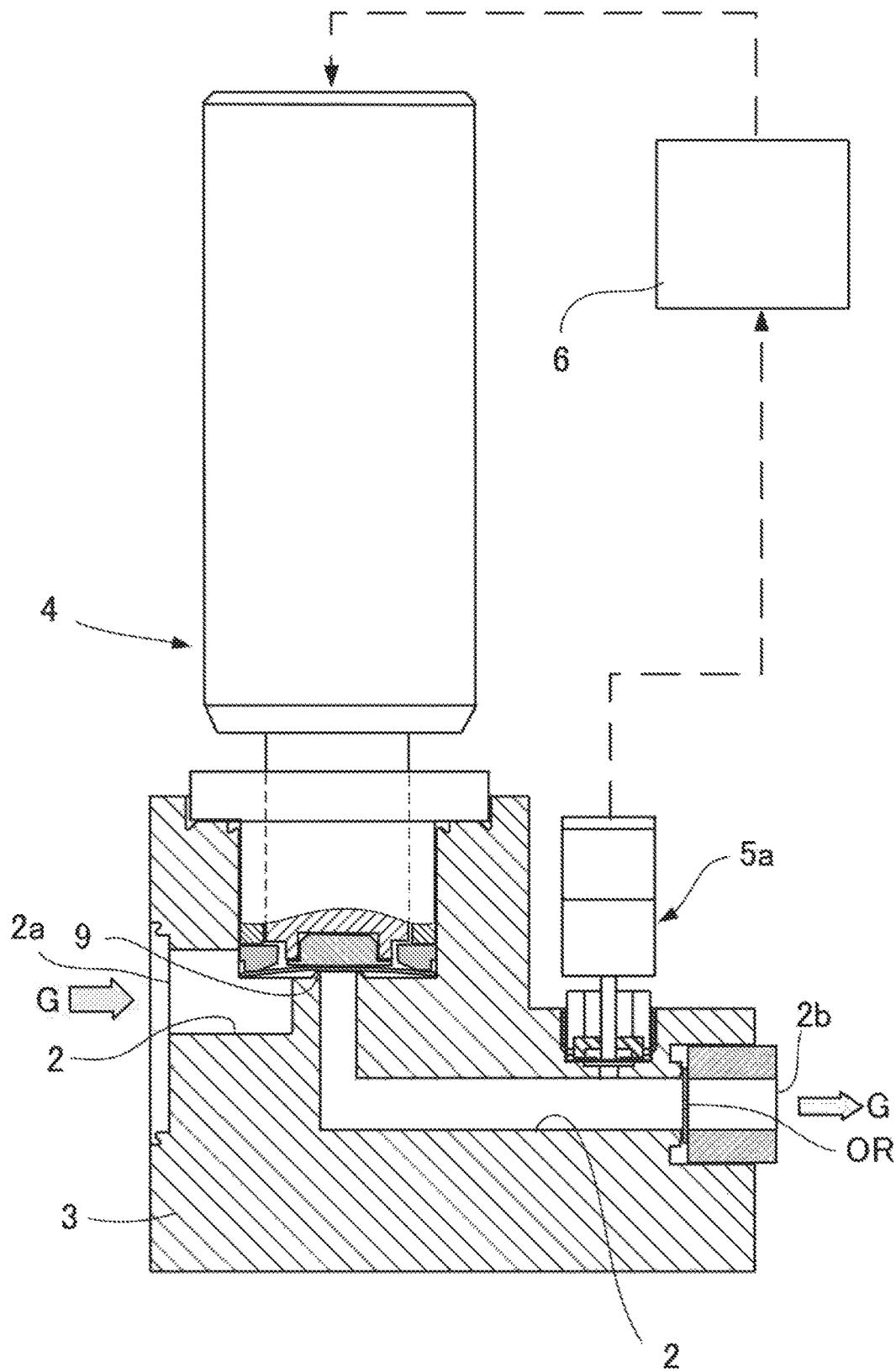
FIG. 11 A partial longitudinal-sectional front view showing a conventional flow controller.

In the comparative example, the pressure-type flow controller shown in FIG. 11 was used. In the comparative example, the internal volume of the flow passage from the valve seat 9 of the control valve 4 to the restriction part OR was 0.6 cc.

Both in the examples and comparative example, as the restriction part OR, an orifice plate having an orifice diameter of 1.52 mm and a thickness of 1.0 mm was used.

In Example 1, Example 2, and the comparative example, the downstream side was evacuated, and, with the control valve 4 opened, nitrogen gas was fed at a feed pressure of 500 kPa gauge pressure and a set flow of 50 l/min, which is a full-scale (100%) flow range. The pressure detected by the first pressure detector 5a was monitored, and pressure oscillation was measured for 5 seconds.

Figure 8:
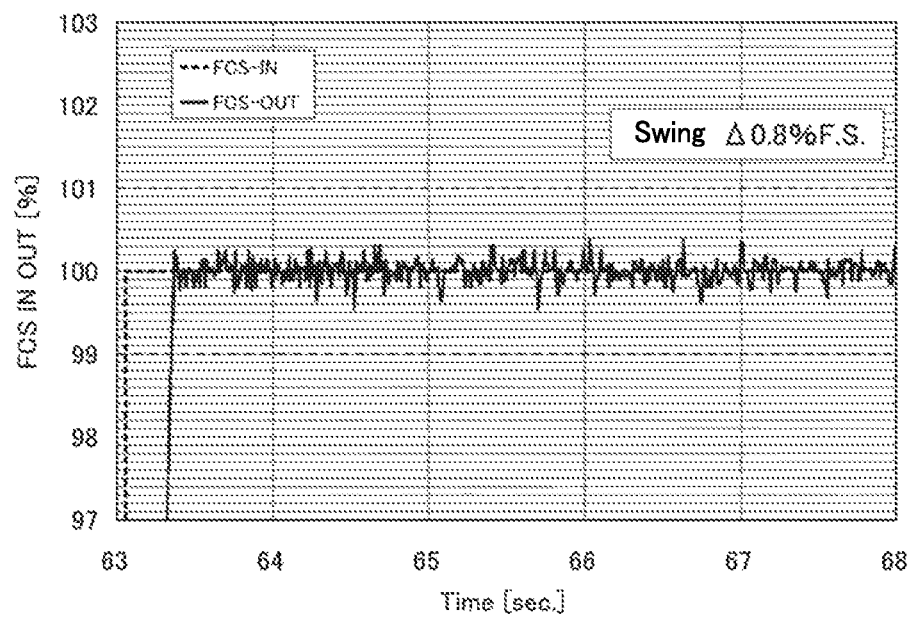
FIG. 8 A graph showing the monitored flow output in a comparative example.
Figure 9:
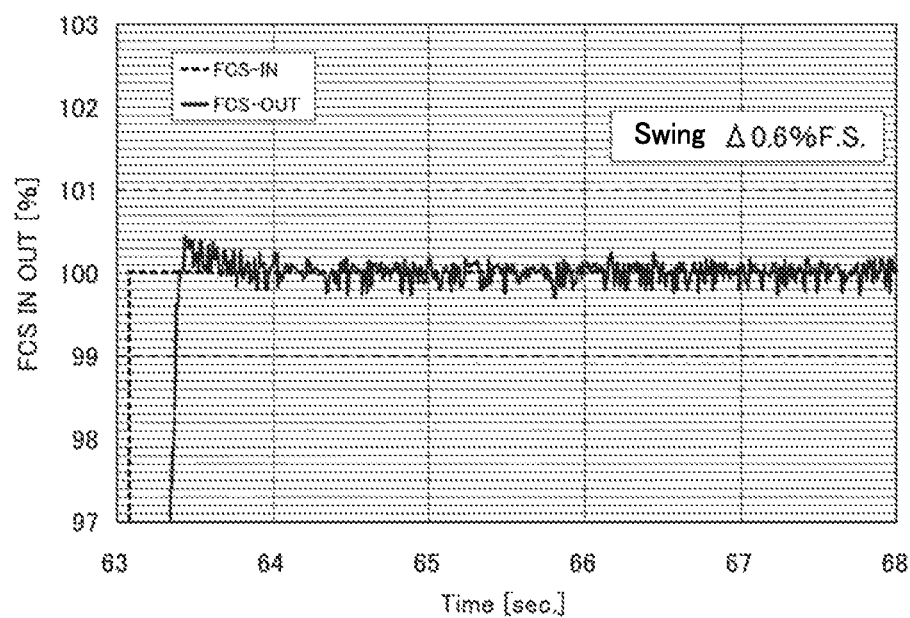
FIG. 9 A graph showing the monitored flow output of the flow controller according to the present invention in Example 1.
Figure 10:
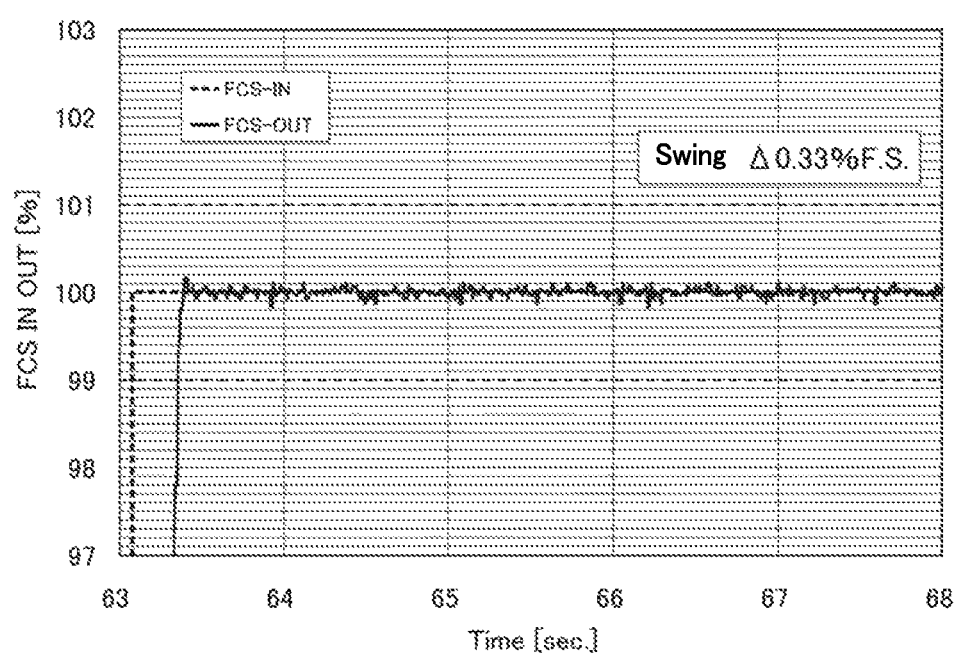
FIG. 10 A graph showing the monitored flow output of the flow controller according to the present invention in Example 2.

FIG. 8 is a graph showing the monitored flow output (FCS-OUT) relative to the set input (FCS-IN) in the comparative example. FIG. 9 is a graph showing the monitored flow output (FCS-OUT) relative to the set input (FCS-IN) in Example 1. FIG. 10 is a graph showing the monitored flow output (FCS-OUT) relative to the set input (FCS-IN) in Example 2.

The flow controllers each compute the flow based on the pressure detected by the first pressure detector 5a, and the computed flow can be output. In addition, the oscillation of the detected pressure appears as hunting in the flow computed based on the detected pressure. From the graphs of FIG. 8 to FIG. 10, it can be seen that at each flow rate, the expansion chamber and the distribution plate have attenuation effects on flow output hunting due to pressure oscillation.

REFERENCE SIGNS LIST

1: Flow controller
2a: Gas inlet
2b: Gas outlet
2c: Inlet-side flow passage
2d: First flow passage
2e: Second flow passage
3: Main body block
3b: Main body recess
3b1: Spotfacing part
4: Control valve
5a: First pressure detector
5b: Second pressure detector
6: Controller
7: Expansion chamber
7a: Upstream-side opening
7b: Downstream-side opening
8: Distributor
13: Lid body
13a: Lid body recess
13b: Spotfacing hole
OR: Restriction part

The invention claimed is:

1. A flow controller comprising:
a control valve;
a first flow passage provided on a downstream side of the control valve;
a second flow passage;
an expansion chamber provided between the first flow passage and the second flow passage; and
a main body block having formed therein the first flow passage and the second flow passage,
wherein the second flow passage is provided in a position that is not on an extension of the first flow passage,
wherein the expansion chamber is formed by a cavity which is formed of a main body recess formed in the main body block and a lid body attached to the main body block so as to close the main body recess,
wherein the first flow passage extends straight down from the control valve and opens into the upper part of the expansion chamber, and the second flow path opens into the side of the expansion chamber, and
wherein the cavity into which fluid flows has a depth greater than the length of the first flow passage.

2. A flow controller comprising:
a control valve;
a first flow passage provided on a downstream side of the control valve;
a second flow passage;
an expansion chamber provided between the first flow passage and the second flow passage;
a distribution plate disposed in the expansion chamber; and
a main body block having formed therein the first flow passage and the second flow passage,
wherein the expansion chamber is formed by a cavity which is formed of a main body recess formed in the main body block and a lid body attached to the main body block so as to close the main body recess,
wherein the first flow passage extends straight down from the control valve and opens into the upper part of the expansion chamber, and the second flow path opens into the side of the expansion chamber, and
wherein the cavity into which fluid flows has a depth greater than the length of the first flow passage.

3. The flow controller according to claim 1, wherein the second flow passage includes a restriction part.

4. The flow controller according to claim 3, wherein a first pressure detector is provided between the control valve and the restriction part.

5. The flow controller according to claim 4, wherein the first pressure detector is provided on the second flow passage and upstream from the restriction part.

6. The flow controller according to claim 5, further comprising a second pressure detector for detecting the pressure in the second flow passage on a downstream side of the restriction part.

7. The flow controller according to claim 1, wherein the lid body has formed therein a lid body recess for increasing a volume of the expansion chamber, whereby
the cavity of the expansion chamber into which fluid flows is larger than the volume of the main body recess.

8. The flow controller according to claim 7, wherein the main body block and the lid body are joined together through a metal sealing gasket.

9. The flow controller according to claim 8, wherein a spotfacing part for receiving the lid body is formed around the main body recess.

10. The flow controller according to claim 9, wherein in the lid body, a spotfacing hole for a bolt for fixing the lid body to the main body block is formed around the lid body recess.

11. The flow controller according to claim 1, wherein a distribution plate is disposed in the expansion chamber.

12. The flow controller according to claim 2, wherein a distribution plate retainer is provided in the expansion chamber, the distribution plate retainer being provided between an upstream-side opening formed by the first flow passage opening into the expansion chamber and a downstream-side opening formed by the second flow passage opening into the expansion chamber and retaining the distribution plate at a predetermined distance from the upstream-side opening.

13. The flow controller according to claim 12, wherein the distribution plate retainer has a tubular peripheral wall having an aperture and is disposed in such a manner that the aperture faces the downstream-side opening of the expansion chamber.

14. The flow controller according to claim 12, wherein the distribution plate retainer is fixed to the lid body.

15. The flow controller according to claim 12, wherein the distribution plate is fixed by welding to the distribution plate retainer.

16. The flow controller according to claim 2, wherein the distribution plate is formed of a metal mesh.

17. The flow controller according to claim 2, wherein the lid body has formed therein a lid body recess for increasing a volume of the expansion chamber, whereby the cavity of the expansion chamber into which fluid flows is larger than the volume of the main body recess.

18. The flow controller according to claim 17, wherein the main body block and the lid body are joined together through a metal sealing gasket.

19. The flow controller according to claim 18, wherein a spotfacing part for receiving the lid body is formed around the main body recess.

20. The flow controller according to claim 19, wherein in the lid body, a spotfacing hole for a bolt for fixing the lid body to the main body block is formed around the lid body recess.

* * * * *